H. A. BURCH.
TIRE.
APPLICATION FILED DEC. 14, 1915.
1,268,924.
Patented June 11, 1918.
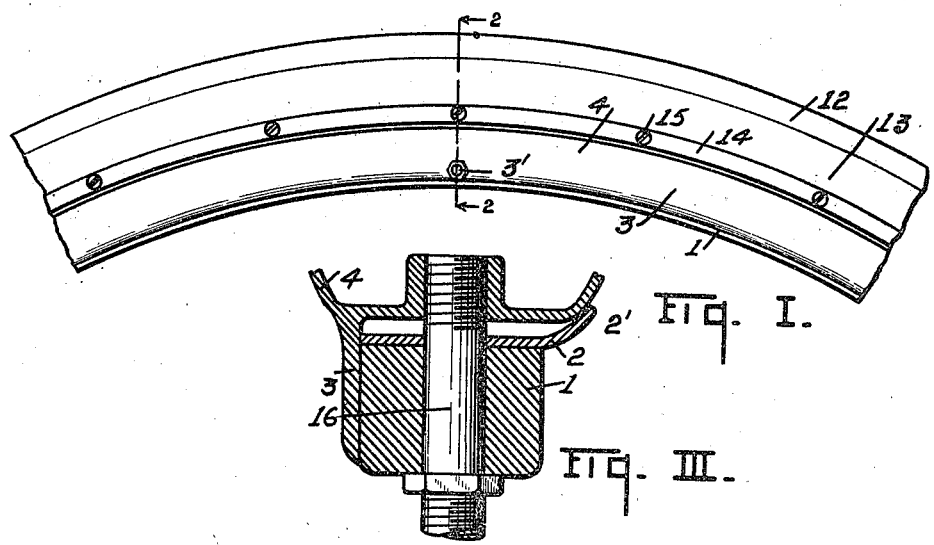
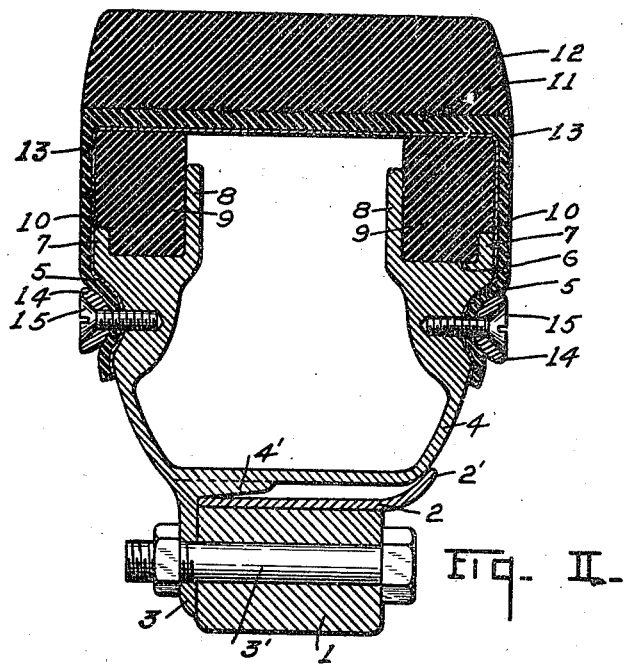
WITNESSES:
H. P. Sears
P. W. Pomeroy
INVENTOR.
HERBERT A. BURCH
BY Chappell Earl
ATTORNEYS.

UNITED STATES PATENT OFFICE.

HERBERT A. BURCH, OF KALAMAZOO, MICHIGAN.

TIRE.

1,268,924.  Specification of Letters Patent.  Patented June 11, 1918.

Application filed December 14, 1915. Serial No. 66,845.

*To all whom it may concern:*

Be it known that I, HERBERT A. BURCH, a citizen of the United States, residing at the city and county of Kalamazoo, State of Michigan, have invented certain new and useful Improvements in Tires, of which the following is a specification.

This invention relates to improvements in tires.

The main objects of this invention are:

First, to provide an improved combined cushion and pnuematic tire.

Second, to provide an improved combined cushion and pneumatic tire which does not require the carrying of air under high pressure in order to secure satisfactory results.

Third, to provide an improved tire having this advantage which is not likely to be punctured.

Fourth, to provide an improved tire having the above advantages which, if punctured, may be used temporarily without certain injury resulting to the tire.

Fifth, to provide an improved combined cushion and pneumatic tire which is quite economical to produce and is durable in use.

Further objects, and objects relating to structural details, will definitely appear from the detailed description to follow.

I accomplish the objects of my invention by devices and means described in the following specification. The invention is clearly defined and pointed out in the claims.

A structure which is a preferred embodiment of this invention is clearly illustrated in the accompanying drawing, forming a part of this specification, in which:

Figure I is a detail side view of a section of a rim with a section of my improved tire mounted thereon.

Fig. II is an enlarged detail section on a line corresponding to line 2—2 of Fig. I.

Fig. III is an enlarged detail section showing the arrangement of the inflating valve.

In the drawings similar reference numerals refer to similar parts throughout the several views.

Referring to the drawings, 1 represents the felly of a wheel having metal rim or channel member 2 thereon with an upturned flange 2' at one side.

My improved tire comprises a body member 4 formed of metal channel shaped in cross section and adapted to be slipped on the rim 2, as illustrated in the accompanying drawing. The body member 4 is provided with a series of tapered wedges 4' which coact with the flange 2' in centering the body member on the rim and in providing a tight fit thereon. The body member is provided with a flange 3 which laps against the side of the felly and is clamped thereon by means of the bolts 3'. This flange closes the opening between the body member and the rim on one side while the body member is clamped against the flange 2' of the rim on the opposite side, thus substantially closing the space between the body member of the tire and the rim. This is of advantage in the matter of appearance and also it prevents the collection of dust and mud in this space.

The body member 4 is provided with outwardly facing grooves 5 in the sides of its side portions and with channel-like seats 6 in the peripheries of its side portions. The side portions are offset inwardly by the thickening of their edges to accommodate the seats which are of substantial width. The outer walls 7 of the seats are relatively narrow while the inner walls 8 are of such width as to effectively support the inner sides of the cushion members 9 arranged in the seats. The cushion members 9 are in the form of rings and are formed of rubber or suitable rubber composition to provide resiliency and are shouldered at 10 so as to overlap the outer walls of the seat, the outer sides of the cushion members being flush or substantially so with the outer sides of the body member. The seats are preferably rectangular in cross section, and the cushion members are correspondingly shaped and provided with the shoulders as described.

The tread member 11 has a tread portion 12 of suitable rubber composition secured thereto and is fitted over and carried by the cushions 9. The tread member is provided with side flaps 13 which fit the outer sides of the cushions and overlap the sides of the body member 4, the edges of the flaps being clamped in the annular grooves 5 by means of the rings 14 and the screws 15.

The tread body members are connected so as to retain air under pressure. Air is supplied through the valve 16, shown conventionally in Fig. III.

The tread member is supported and carried so that the strain thereon is minimized and it is supported or provided with a pneumatic cushion, thus securing much of the advantage of a full pneumatic tire. A thick tread may be provided so that it is not likely to be punctured.

The metal body portion of the tire is so protected by the tread and cushions that it is not likely to strike a stone or like obstruction. In the event of a puncture or the loss of air the tread is effectively carried by the cushion so that it may be operated for some time without serious injury and it is not necessary to carry as high pressure as in full pneumatic tires in ordinary use.

I have illustrated and described my improved tire in a simple embodiment. I have not attempted to illustrate or describe certain modifications which I contemplate as I believe the disclosure made will enable those skilled in the art to which my invention relates to embody or adapt the same as conditions may require.

Having thus described my invention, what I claim as new and desire to secure by Letters Patent, is:

1. In a tire, the combination of a metal channel-shaped body member adapted to be mounted on a rim and having channel-like cushion seats in the peripheries of its side portions, the outer walls of said seats being relatively narrow, annular flat faced cushion members arranged in said seats, said cushion members being shouldered to overhang the outer walls of said seats with the outer sides of the cushion members substantially flush therewith, and a resilient tread member mounted on said cushion members and provided with side flaps fitting over the sides of said cushion members and lapped upon and secured to the sides of said body member, said body and tread members constituting a chamber adapted to contain air under pressure.

2. In a tire, the combination of a metal channel-shaped body member adapted to be mounted on a rim and a resilient tread member mounted on said body member and provided with flaps fitting over the edges of said body member and terminating on the sides thereof, the width of the tread being substantially that of the greatest width of the body member, said body member and tread members together constituting a chamber adapted to contain air under pressure, the edges of said flaps being secured throughout to the sides of said body member and adjacent the edges thereof by clamping means engaging the side of the said body member.

In witness whereof, I have hereunto set my hand and seal in the presence of two witnesses.

HERBERT A. BURCH. [L. S.]

Witnesses:
 LUELLA G. GREENFIELD.
 MARGARET L. GLASGOW.